United States Patent
Anderson et al.

(10) Patent No.: US 11,701,694 B2
(45) Date of Patent: Jul. 18, 2023

(54) AUTOMATED CALIBRATION AND REALTIME COMMUNICATION OF DATA, PROBLEMS, DAMAGE, MANIPULATION, AND FAILURE FROM A NETWORK OF BATTERY POWERED SMART GUIDE NODES WITHIN A ROLLING MILL

(71) Applicant: PRIMETALS TECHNOLOGIES USA LLC, Alpharetta, GA (US)

(72) Inventors: Matthew Anderson, Lancaster, MA (US); Michelle Le, Worcester, MA (US)

(73) Assignee: Primetals Technologies USA LLC, Alpharetta, GA (US)

( * ) Notice: Subject to any disclaimer, the term of this patent is extended or adjusted under 35 U.S.C. 154(b) by 14 days.

(21) Appl. No.: 17/345,106

(22) Filed: Jun. 11, 2021

(65) Prior Publication Data
US 2022/0395880 A1    Dec. 15, 2022

(51) Int. Cl.
*B21B 37/46*    (2006.01)
*B21B 38/00*    (2006.01)
(Continued)

(52) U.S. Cl.
CPC ............ *B21B 37/46* (2013.01); *B21B 38/006* (2013.01); *B21B 39/165* (2013.01);
(Continued)

(58) Field of Classification Search
CPC ....... B21B 37/46; B21B 37/58; B21B 38/006; B21B 38/008; B21B 39/006;
(Continued)

(56) References Cited

U.S. PATENT DOCUMENTS 2,368,129 A    1/1945  Fors et al.
4,790,164 A *  12/1988  Rothe .................. B21B 39/165
                                                  226/177
(Continued)

FOREIGN PATENT DOCUMENTS

EP    0740967 A1 *  11/1996  ........... B21B 39/165
EP    740967 A1    11/1996
(Continued)

OTHER PUBLICATIONS

International Search Report and Written Opinion dated Aug. 31, 2022 corresponding to PCT International App. No. PCT/US2022/031020 filed May 26, 2022.

*Primary Examiner* — Edward T Tolan
(74) *Attorney, Agent, or Firm* — Gesmer Updegrove LLP

(57) ABSTRACT

Disclosed is a system for use in a rolling mill having: (a) a roll holder housing a plurality of rollers; (b) a smart module coupled to the roll holder, the smart module comprising: (1) a power source powering the smart module; (2) a microcontroller; (3) a motor, the motor, based on instructions from the microcontroller, controlling a position of the plurality of rollers by moving the roll holder; (4) one or more position sensors, the one or more position sensors detecting the position of the roll holder; and (5) a communication module, the communication module communicating with a central controlling computer to: (i) communicate the position of the roll holder and other sensor data to the central controlling computer, and (ii) receive instructions from the central controlling computer to control the position of the roll holder.

25 Claims, 4 Drawing Sheets

(51) Int. Cl.
  *B21B 39/16* (2006.01)
  *G05B 23/02* (2006.01)
  *G08B 5/36* (2006.01)
  *G10L 25/18* (2013.01)

(52) U.S. Cl.
  CPC ............ *G05B 23/027* (2013.01); *G08B 5/36* (2013.01); *G10L 25/18* (2013.01); *B21B 2203/26* (2013.01)

(58) Field of Classification Search
  CPC ... B21B 39/165; B21B 31/16; B21B 2203/26; B21B 2275/04
  See application file for complete search history.

(56) References Cited

U.S. PATENT DOCUMENTS

| | | | | |
|---|---|---|---|---|
| 5,174,142 | A * | 12/1992 | Pong | B21B 1/0815 72/428 |
| 6,209,378 | B1 | 4/2001 | Bradshaw | |
| 6,463,775 | B1 * | 10/2002 | Kodama | B21B 38/008 72/11.1 |
| 10,654,085 | B2 * | 5/2020 | De Giorgio | B65H 57/06 |
| 2004/0172801 | A1 * | 9/2004 | Shimoda | B21B 5/00 29/407.05 |
| 2015/0298187 | A1 * | 10/2015 | Stanard, Jr. | B21B 37/68 72/11.1 |
| 2017/0173652 | A1 * | 6/2017 | Viviroli | B21B 38/10 |
| 2017/0341118 | A1 * | 11/2017 | Englund | B21B 39/165 |

FOREIGN PATENT DOCUMENTS

| | | |
|---|---|---|
| JP | H03161112 A | 7/1991 |
| JP | 2000158044 A | 6/2000 |
| WO | WO 99/47285 A1 * | 9/1999 |
| WO | WO 2005/111451 A1 * | 11/2005 |

* cited by examiner ically adjust the guides into the correct orientation. This process is time consuming and can lead to carelessness, mistakes, and general inconsistencies from one operator, one day, or even one guide to the next. The disclosed methodology provides automatic calibration and adjustment to the roller guides.

AUTOMATED CALIBRATION AND REALTIME COMMUNICATION OF DATA, PROBLEMS, DAMAGE, MANIPULATION, AND FAILURE FROM A NETWORK OF BATTERY POWERED SMART GUIDE NODES WITHIN A ROLLING MILL

BACKGROUND OF THE INVENTION

Field of Invention

The present invention relates generally to the field of rolling mills. More specifically, the present invention is related to automated calibration and real-time communication of data, problems, damage, manipulation, and failure in roller guides of the rolling mill using a network of battery powered smart guide nodes.

Discussion of Related Art

A roller guide can mistakenly be calibrated to the wrong side (or incorrect hand: LH vs. RH) or installed on a stand of the wrong hand (in a two-strand rolling mill with opposite hand stands on each strand). This condition is not possible to detect by visual inspection, and the guide may be put into operation without the knowledge of the operators. Running in the mill in this flawed condition may cause early guide failure, unplanned mill downtime, and/or poor finished product quality. The disclosed methodology provides real time feedback and alerts to the operators if the guide is positioned incorrectly.

A roller guide can be manually manipulated after calibration while it is sitting idle before installation on the rolling mill. This condition is poor practice and is not readily obvious to other operators. The manipulated adjustment may lead to early guide failure, unplanned mill downtime, and/or poor finished product quality. The disclosed methodology provides real time feedback and alerts to the operators if the guide has been manipulated or manually adjusted after calibration.

A roller guide or other equipment in a rolling mill can sometimes have a problem that first presents itself as a change in sound. Some of these problems may be detected by the operators that are experienced in identifying these sound changes, but others may be missed or simply not obvious. The disclosed methodology provides a solution for real time sound identification of problems followed by an alert for the operators.

A roller guide can be inadvertently set for the wrong finished product size. This condition is not always readily obvious to the operators and would require very careful inspection to identify. Running in a mill in this condition may lead to early guide failure, unplanned mill downtime, and/or poor finished product quality. The disclosed methodology provides real time feedback to the operators if a guide is selected for use or put into use that is set to the wrong product prior to running the mill.

Adjustment and calibration of roller guides requires a good amount of manual labor to physically adjust the guides into the correct orientation. This process is time consuming and can lead to carelessness, mistakes, and general inconsistencies from one operator, one day, or even one guide to the next. The disclosed methodology provides automatic calibration and adjustment to the roller guides.

Each of the problems are currently performed manually and may only be identified by careful attention and individual inspection by the operators.

U.S. Pat. No. 6,209,378 to Bradshaw discloses a roller guide assembly for guiding a workpiece into a roll pass of a rolling mill. FIG. 5 depicts Bradshaw's roller guide assembly 18. The guide assembly comprises: a rigid housing structure; a pair of roller holders 26 extending lengthwise of the housing structure on opposite sides of the intended direction of travel of the workpiece with compression springs 32 located in bores in the roller holders 26 (where the springs are captured in their respective bores via cover plates 34 and the housing structure further includes vertical pivots 30); guide rollers 28 rotatably carried on the roller holders 26, the guide rollers 28 defining a gap therebetween and being configured to engage and guide the workpiece into the roll pass of the rolling mill; pivots for mounting the roller holders on the housing structure for movement about axes extending generally parallel to the rotational axes of the guide rollers; springs for applying forces to the roller holders to rotate the roller holders about their respective axes in directions urging the guide rollers apart; and stops on the housing structure for resisting rotation of the roller holders, at least one of the stops acting through a force sensor to provide a measure of the force being applied to the respective roller holder. The spring-induced rotation of the roll holders 26 is resisted by stops comprising adjusting screws 36 positions to be contacted by load sensitive sensors 38. The drive point 48 a is for manual adjustment, generally used for off-line setting of the guide.

Embodiments of the present invention are an improvement over prior art systems and methods.

SUMMARY OF THE INVENTION

In one embodiment, the present invention provides a system for use in a rolling mill comprising: (a) a roll holder housing a plurality of rollers; and (b) a smart module coupled to the roll holder, the smart module comprising: (1) a power source powering the smart module; (2) a microcontroller; (3) a motor, the motor, based on instructions from the microcontroller, controlling a position of the plurality of rollers by moving the roll holder; (4) one or more position sensors, the one or more position sensors detecting the position of the roll holder; and (5) a communication module, the communication module communicating with a central controlling computer to: (i) communicate the position of the roll holder and other sensor data to the central controlling computer, and (ii) receive instructions from the central controlling computer to control the position of the roll holder.

In another embodiment, the present invention provides a system for use in a rolling mill comprising: (a) a roll holder housing a plurality of rollers; (b) a smart module coupled to the roll holder, the smart module comprising: (1) a power source powering the smart module; (2) a microcontroller; (3) a motor, the motor, based on instructions from the microcontroller, controlling a position of the plurality of rollers by moving the roll holder; (4) one or more position sensors, the one or more position sensors detecting the position of the roll holder; (5) a microphone for collecting sound data, wherein the microcontroller performs audio spectral analysis on the collected sound data, identifies, based on the audio analysis, one or more problems associated with the rolling mill, and (6) a communication module, the communication module communicating with a central controlling computer to: (i) communicate the position of the roll holder and other sensor data to the central controlling computer, (ii) receive instructions from the central controlling computer to control the position of the roll holder, and (iii) communicating the one or more problems identified based on audio analysis to the central controlling computer.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
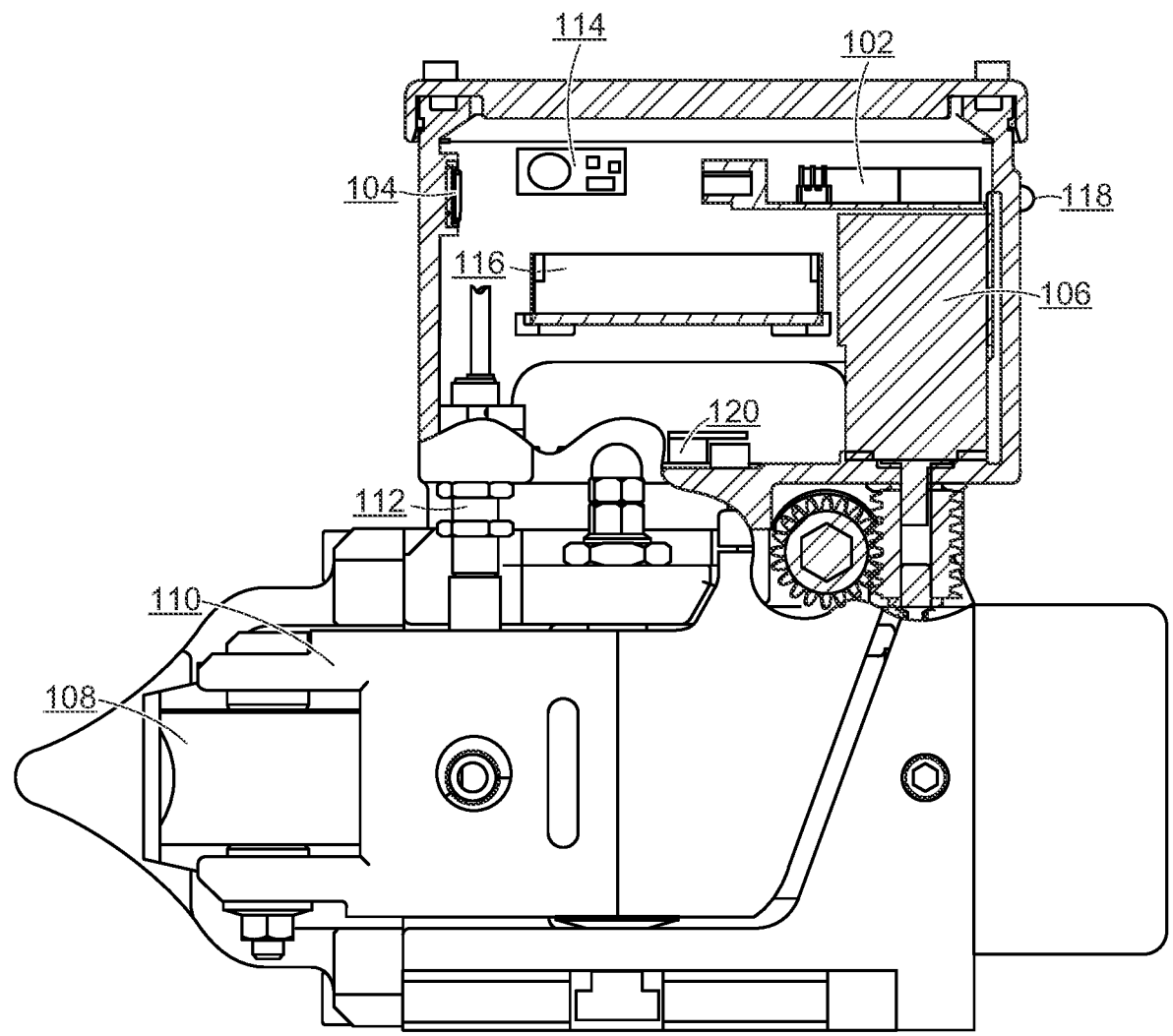
FIG. 1 depicts the addition of a 'smart module' to the roller guide.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Each of the problems are solved with the addition of a 'smart module' to the roller guide. FIG. 1 depicts a smart controller for a roller guide as per the teachings of the present invention. The smart module comprises a micro controller 102, wireless communication module 104, motor 106 (e.g., stepper motor(s)) for controlling the position of the rollers 108 by moving the roller holders 110, an accelerometer 120, that detects acceleration and orientation, position sensors 112 for sensing the position of the roller holders, a temperature sensor to measure temperature at one or more locations within the roller guide, and a microphone 114. The accelerometer is used to determine the orientation of the roller guide in space by measuring acceleration due to gravity across three axes. When sitting level, the z-axis will measure the full effect of gravity, as the guide is tilted to one side. One of the other axes will start to measure some of the effect of gravity. This data is used to calculate angular position of the guide. The accelerometer is also measuring acceleration amplitude in general for the X, Y, and Z axes, so a determination can be made if there is a problem that manifests as an increase in vibration.

It is also noted that in one embodiment, the accelerometer data is used to detect if the roller guide mounting has become loose during rolling. In this scenario, the operator will be unaware of the loose mounting situation because the cover of the mill is closed during operation. If the accelerometer shows a change in orientation during operation, the central controlling computer will alert the operator that the guide may have become loose from its mounting.

The temperature sensor can measure the overall ambient temperature inside the smart module or the bulk temperature of the guide itself depending on mounting location. If the guide has a certain kind of problem, and the bulk temperature of the guide or ambient air starts to increase, the temperature sensor will detect this change, and will alert the operator as necessary. This will be used in conjunction with other sensor data, like the microphone and accelerometer to help determine what the problem is, and if it is severe enough to shut the mill down to investigate.

The smart module is powered by a rechargeable battery 116, which allows complete wireless operation in the rolling mill, and it is fitted with a multi-color LED 118, to indicate various alerts or states.

Figure 4:
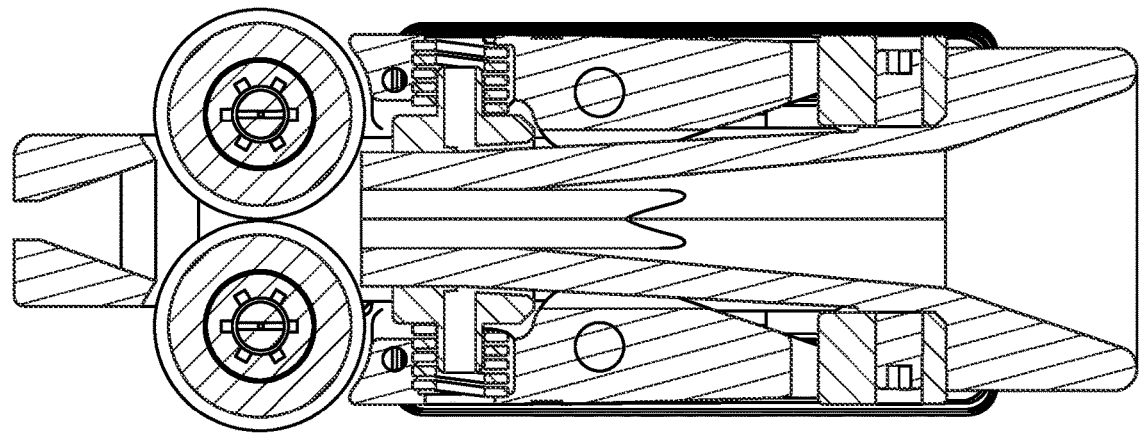
FIG. 4 depicts a pair of roller holders.
Figure 5:
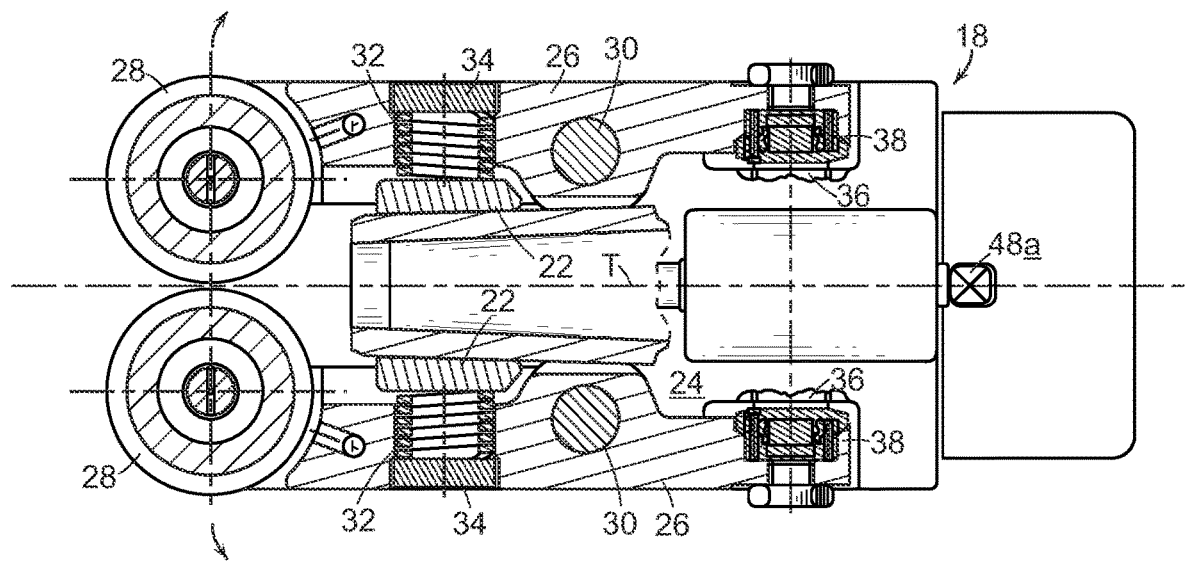
FIG. 5 depicts a prior art roller guide assembly.

FIG. 4 depicts a pair of roller holders. Typically, a pair or rollers are standard, where one roller is held in each roll holder. Occasionally, two rollers for each roll holder may also be used.

The accelerometer is used to detect the orientation of the guide in space, specifically it is used to detect if the guide is mounted on the correct hand (LH vs. RH) stand. The stands are oriented at a 90-degree angle to each other, and generally at a 45-degree angle to the ground, so the signal from the accelerometer is used to detect if the guide is mounted to a LH stand or a RH stand. The accelerometer is also used to detect vibration in the guide, specifically vibration from the rollers/bearings to determine if they have failed.

Figure 2:
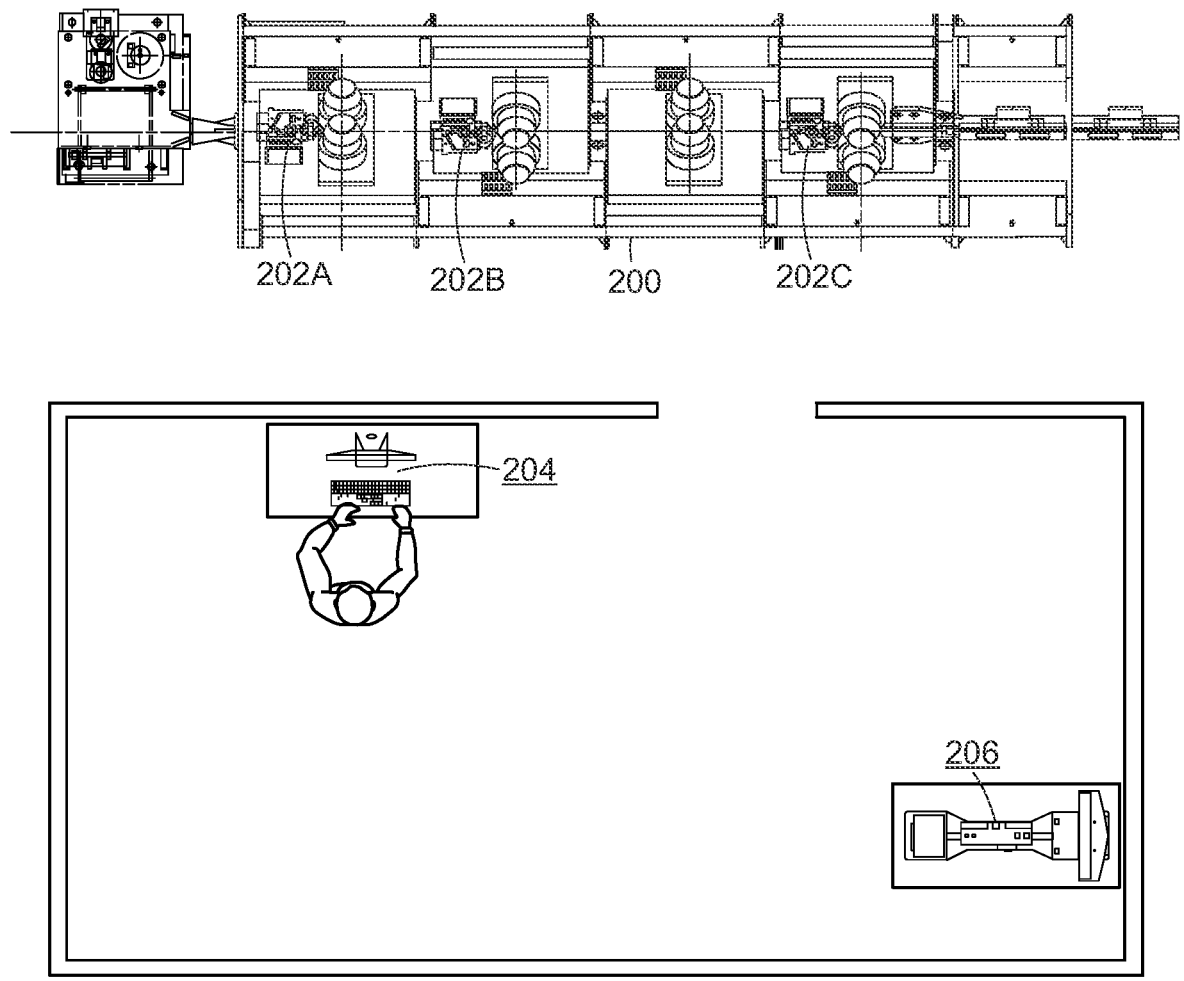
FIG. 2 depicts the overall arrangement of how the system of the present invention would be set up in a rolling mill.

The overall arrangement of how such a system would be set up in a rolling mill is shown in FIG. 2. Multiple guides fitted with smart modules 202A through 202C, which are mounted in position on the rolling mill 200. The smart modules simultaneously communicate to and from a nearby central controlling computer 204. The central computer can set the operational mode of each smart module, send a command to move guide rollers, as well as receive data from the smart modules including sensor data, warnings, and general information.

Prior to installation on the rolling mill, the roller guides are calibrated on an offline alignment station 206, which is also a computer-controlled system. The offline alignment station can also communicate with the smart modules.

Figure 3:
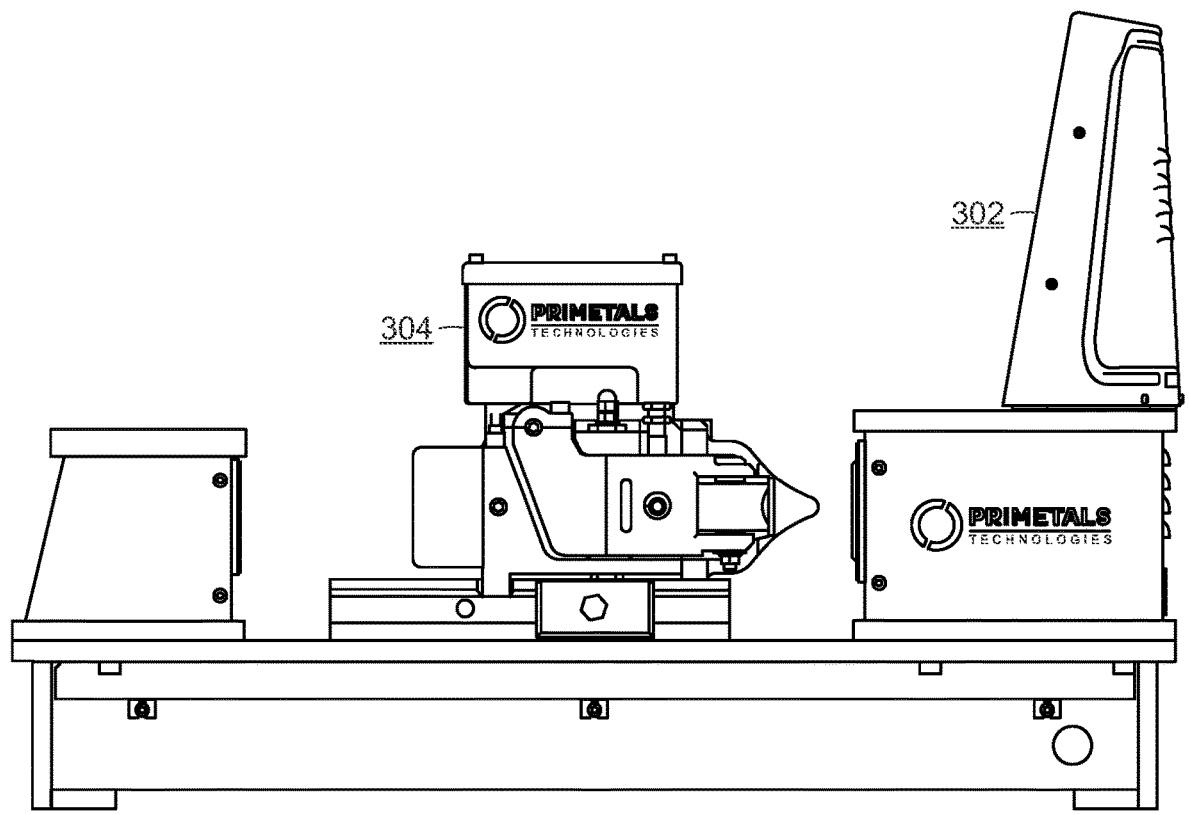
FIG. 3 illustrates the calibration process associated with the roller guides.

FIG. 3 illustrates the calibration process, in which the offline alignment station 302, sends positional information to the smart module 304, which in turn automatically adjusts the position of the guide rollers to their correct position. Once calibration is complete, the offline alignment station communicates a variety of setting information, including roller position, product size, mounting hand, stand number, etc. to the smart module which saves this data to its memory.

In one embodiment, the present invention provides a system for use in a rolling mill comprising: (a) a roll holder housing a plurality of rollers; (b) a smart module coupled to the roll holder, the smart module comprising: (1) a power source powering the smart module; (2) a microcontroller; (3) a motor, the motor, based on instructions from the microcontroller, controlling a position of the plurality of rollers by moving the roll holder; (4) one or more position sensors, the one or more position sensors detecting the position of the roll holder; and (5) a communication module, the communication module communicating with a central controlling computer to: (i) communicate the position of the roll holder and other sensor data to the central controlling computer, and (ii) receive instructions from the central controlling computer to control the position of the roll holder.

In another embodiment, the present invention provides a system for use in a rolling mill comprising: (a) a roll holder housing a plurality of rollers; (b) a smart module coupled to the roll holder, the smart module comprising: (1) a power source powering the smart module; (2) a microcontroller; (3) a motor, the motor, based on instructions from the microcontroller, controlling a position of the plurality of rollers by moving the roll holder; (4) one or more position sensors, the one or more position sensors detecting the position of the roll holder; (5) a microphone for collecting sound data, wherein the microcontroller performs audio spectral analysis on the collected sound data, identifies, based on the audio analysis, one or more problems associated with the rolling mill, and (6) a communication module, the communication module communicating with a central controlling computer to: (i) communicate the position of the roll holder and other sensor data to the central controlling computer, (ii) receive instructions from the central controlling computer to control the position of the roll holder, and (iii) communicating the one or more problems identified based on audio analysis to the central controlling computer.

The position of the rollers via the position sensors is stored on the smart module memory so the smart module can notify the operators if changes have been made after calibration. When the smart module is powered on, the microcontroller continuously compares the current output of the position sensors to the stored values. If a change (over a prescribed threshold) has been detected, the smart module will give an indication, such as having the built in LED flash red.

The product size that each guide is set for is stored on the smart module memory from the calibration process. Before guides can be used in the rolling mill, they must be synched via a handshake with the central controlling computer. This handshake transfers the data stored in the smart module memory to the central computer and sets the guide into a 'ready for use' mode. The operator must select the product that is being rolled on the central computer before synching any guides to the rolling campaign. If an operator tries to add a guide that is set for a different product, the operator will be alerted of the problem.

The mounting hand is stored because the calibrated hand must match the hand that the guide is mounted in the rolling mill. When the roller guide is ready to be installed onto the rolling mill, the power for the smart module is turned on. Once powered, the microcontroller continuously reads the orientation data from the accelerometer and compares it to the calibrated hand. If the orientation matches the calibrated hand, the smart module will give an indication, such as turning the built in LED green. If the orientation is opposite the calibrated hand, the smart module will give an indication, such as having the built in LED flash red.

When the roller guide is mounted in the rolling mill an operator can send a command via the central computer to start detecting problems using sound. The smart module collects sound data from the microphone and performs an audio spectral analysis with Fast Fourier Transform. The smart module transmits the spectral component data to the central computer, which analyzes the data for potential problems. If a problem is identified, the operator is notified.

Although position sensors 112 are shown in FIG. 1, other sensors are also envisioned in addition to the position sensors 112. For example, in one embodiment, the accelerometer block 120 or the position sensor block 112 could additionally include a temperature sensor that may be used to identify problems in the rolling mill. Alternatively, the temperature sensor could be an independent sensor mounted anywhere in the structure shown in FIG. 1.

Advantages of the present invention include fewer guide failures, superior finished product quality, less rolling mill downtime, longer useful life of guiding equipment, and less manpower required to maintain and monitor the roller guides as compared to the prior art solution.

Specifically, the feature of adding a smart module to the guide with embedded sensors and wireless communication to a central computer allows the described advantages to be performed.

Another advantage of the present invention involves the ability to retrofit or upgrade existing mills.

A different configuration of sensors and actuators could potentially also solve the problems. Additionally, the communication could be completely wired as opposed to wireless, and the smart modules could be powered by main line power rather than individual batteries.

In one embodiment, the smart modules communicate with each other as well as with the central controlling computer. This would allow in certain situations for the guides to instruct each other to do something in the event of a failure, or allow for a particular application without a central controlling computer, or just generally improve the efficiency of the system.

In another embodiment, there is no need for a central controlling computer, as the smart module made adjustments and decisions on its own and operated in an autonomous manner but could optionally still communicate with other smart modules. This configuration could still have a central display screen that would show information from the smart module(s). Smart modules may communicate to each other via wireless communication, in the same way they communicate to the central controlling computer. It could also be done via a wired connection. There are several situations where communication between smart modules can be advantageous. An example of such a situation is where relatively large distances exist between smart modules (in a mill where multiple mill locations exist that utilize smart guides), and direct communication between a guide and the central controlling computer may not be possible. In this case, a cascading of commands could be achieved by sending a communication to one smart module, which would in turn direct other smart modules to do something. Another area where direct communication would be advantageous is that it simplifies the communication that is necessary between the central controlling computer and the guides. For example, if all five guides in a mill are to be activated, a command may be sent to each guide to activate the guide to begin sending sensor data to the central controlling computer. In a scenario where one of the guides is defined as a 'master', we could send the activate command to that one guide, which in turn would send the activate command to the four other guides (which are 'slaves') in the mill. Ideally, a system would have a combination of both central computer to guide communication and direct guide to guide communication. Communication between smart modules can be done with the same equipment.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of an automated calibration and real-time communication of data, problems, damage, manipulation, and failure using a network of battery powered smart guide nodes within a rolling mill. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:
1. A system for use in a rolling mill comprising:
 (a) a roll holder housing a plurality of rollers;
 (b) a smart module coupled to the roll holder, the smart module comprising:
  (1) a power source powering the smart module;
  (2) a microcontroller;
  (3) a motor, the motor, based on instructions from the microcontroller, controlling a position of the plurality rollers by moving the roll holder;
  (4) one or more position sensors, the one or more position sensors detecting the position of the roll holder;
  (5) an accelerometer detecting an orientation of the roll holder; and
  (6) a communication module, the communication module communicating with a central controlling computer to: (i) communicate the position and the orientation of the roll holder to the central controlling computer, and (ii) receive instructions from the central controlling computer to control the position of the roll holder.

2. The system of claim 1, wherein the smart module further comprises an indicator for notification of one or more alerts associated with a condition of the rolling mill.

3. The system of claim 2, wherein the indicator is a multicolor light emitting diode (LED).

4. The system of claim 2, wherein the one or more alerts are any of the following: a first alert that is generated when a sensed position of the roll holder is different than a calibrated position of the roll holder by a predetermined threshold, a second alert that is generated when a size of a product that is being rolled is different than a calibrated size, a third alert that is generated when a sensed orientation of the roll holder is different than a calibrated orientation of the roll holder, a fourth alert that is generated when audio spectral analysis of sound data collected via a microphone indicates a problem with the rolling mill.

5. The system of claim 1, wherein the communications module is capable of wireless communication with the central controlling computer.

6. The system of claim 1, wherein the central computer detects a failure in a given roller within the plurality of roller based on vibration data detected by the accelerometer.

7. The system of claim 1, wherein the smart module further comprises a temperature sensor.

8. The system of claim 1, wherein the power source is a rechargeable battery.

9. The system of claim 1, wherein the smart module further comprises a microphone, the smart module:
collecting sound data from the microphone,
performing audio spectral analysis on the collected sound data,
identifying, based on the audio analysis, one or more problems associated with the rolling mill, and
communicating the one or more problems to the central controlling computer via the communication module.

10. The system of claim 9, wherein the audio spectral analysis is performed via Fast Fourier Transform (FFT).

11. The system of claim 1, wherein the system is calibrated prior to use, wherein such calibration comprises:
receiving, from an offline alignment station, position data for the plurality of rollers,
adjusting the position of the plurality of rollers according to the received position data, and
receiving and storing as part of the calibration one or more of, or a combination of, the following data: roller position data, product size data, mounting hand data, stand number data, user data, and date and time data.

12. The system of claim 1, wherein the central computer detects an improperly mounted roll holder based on the orientation detected by the accelerometer.

13. The system of claim 1, wherein the smart module of the roll holder is configured to communicate with another smart module of another roll holder in the rolling mill.

14. A system for use in a rolling mill comprising:
(a) a roll holder housing a plurality of rollers;
(b) a smart module coupled to the roll holder, the smart module comprising:
(1) a power source powering the smart module;
(2) a microcontroller;
(3) a motor, the motor, based on instructions from the microcontroller, controlling a position of the plurality of rollers by moving the roll holder;
(4) one or more position sensors, the one or more position sensors detecting the position of the roll holder;
(5) an accelerometer detecting an orientation of the roll holder;
(6) a microphone for collecting sound data, wherein the microcontroller performs audio spectral analysis on the collected sound data, identifies, based on the audio analysis, one or more problems associated with the rolling mill, and
(7) a communication module, the communication module communicating with a central controlling computer to: (i) communicate the position and the orientation of the roll holder to the central controlling computer, (ii) receive instructions from the central controlling computer to control the position of the roll holder, and (iii) communicating the one or more problems identified based on audio analysis to the central controlling computer.

15. The system of claim 14, wherein the audio spectral analysis utilizes a Fast Fourier Transform (FFT).

16. The system of claim 14, wherein the smart module further comprises an indicator for notification of one or more alerts associated with a condition of the rolling mill.

17. The system of claim 16, wherein the indicator is a multicolor light emitting diode (LED).

18. The system of claim 16, wherein the one or more alerts are any of the following: a first alert that is generated when a sensed position of the roll holder is different than a calibrated position of the roll holder by a predetermined threshold, a second alert that is generated when a size of a product that is being rolled is different than a calibrated size, a third alert that is generated when a sensed orientation of the roll holder is different than a calibrated orientation of the roll holder, a fourth alert that is generated when the audio spectral analysis of sound data collected via a microphone indicates a problem with the rolling mill.

19. The system of claim 14, wherein the communications module is capable of wireless communication with the central controlling computer.

20. The system of claim 14, wherein the central computer detects a failure in a given roller within the plurality of rollers based on vibration data detected by the accelerometer.

21. The system of claim 14, wherein the smart module further comprises a temperature sensor.

22. The system of claim 14, wherein the power source is a rechargeable battery.

23. The system of claim 14, wherein the system is calibrated prior to use, wherein such calibration comprises:
receiving, from an offline alignment station, position data for the plurality of rollers,
adjusting the position of the plurality of rollers according to the received position data, and
receiving and storing as part of the calibration one or more of, or a combination of, the following data: roller position data, product size data, mounting hand data, stand number data.

24. The system of claim 14, wherein the central computer detects an improperly mounted roll holder based on the orientation detected by the accelerometer.

25. The system of claim 14, wherein the smart module of the roll holder is configured to communicate with another smart module of another roll holder in the rolling mill.

* * * * *